(12) United States Patent
Kuchibhatla et al.

(10) Patent No.: US 9,352,706 B2
(45) Date of Patent: May 31, 2016

(54) ASSEMBLY OF VEHICLE STRUCTURAL COMPONENTS AT A COMMON JOINT

(71) Applicant: Ford Global Technologies, LLC, Dearborn, MI (US)

(72) Inventors: Sreenivas Kuchibhatla, Canton, MI (US); Joseph Strozeski, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/467,263

(22) Filed: Aug. 25, 2014

(65) Prior Publication Data

US 2016/0052466 A1 Feb. 25, 2016

(51) Int. Cl.
*B60R 13/08* (2006.01)
*B60J 5/04* (2006.01)
*B62D 25/04* (2006.01)
*F16B 5/02* (2006.01)
*F16B 35/06* (2006.01)

(52) U.S. Cl.
CPC ............... *B60R 13/08* (2013.01); *B60J 5/0468* (2013.01); *B62D 25/04* (2013.01); *F16B 5/02* (2013.01); *F16B 35/06* (2013.01)

(58) Field of Classification Search
CPC ....... B60R 13/08; B60J 5/0468; B62D 25/04; F16B 35/06; F16B 5/02
USPC ................................ 296/146.11, 144, 187.01
See application file for complete search history.

(56) References Cited

U.S. PATENT DOCUMENTS

| | | | | |
|---|---|---|---|---|
| 6,860,542 B1 * | 3/2005 | Zabtcioglu | ............... | B60J 5/047 292/144 |
| 7,036,874 B2 * | 5/2006 | Stojkovic | ............... | B62D 25/16 296/146.11 |

FOREIGN PATENT DOCUMENTS

| | | |
|---|---|---|
| EP | 2195207 B1 | 2/2013 |
| FR | 2919562 B1 | 3/2010 |
| JP | 2002-347653 | 12/2002 |
| JP | 10-119820 | 5/2010 |
| JP | 10-218028 | 8/2010 |
| JP | 2012-148745 A | 8/2012 |
| KR | 10-2012-0051539 | 5/2012 |

* cited by examiner

*Primary Examiner* — Joseph D Pape
*Assistant Examiner* — Dana Ivey
(74) *Attorney, Agent, or Firm* — Jason Rogers; Bejin Bieneman PLC

(57) ABSTRACT

An assembly includes a base component secured to vehicle frame components and a first body component having an inside surface abutting the base component. The assembly further includes a first fastening member securing the first body component to the base component. The first fastening member has a first flange portion engaging the outside surface of the first body component and a first shaft portion engaging the base component. The assembly also includes a second body component abutting the first flange portion of the first fastening member opposite the first body component and a second fastening member securing the second body component to the first body and base components. The second fastening member has a second flange portion engaging the second body component and a second shaft portion engaging the first shaft portion of the first fastening member.

20 Claims, 3 Drawing Sheets

ASSEMBLY OF VEHICLE STRUCTURAL COMPONENTS AT A COMMON JOINT

BACKGROUND

Vehicles, such as automobiles, pick-up trucks, sport-utility vehicles, minivans, vans and other passenger vehicles, typically incorporate a variety of structural components, such as relatively rigid frame components and relatively thin body components. The number, integrity and robustness of the attachments of such components may impact the noise, vibration and harshness (NVH) characteristics of a vehicle. However, considerations such as design, packaging and manufacturing may limit those attachments. In one exemplary instance, many vehicles locate an instrument panel or cross car beam, body sheet metal, a fender and a door hinge bracket all in the region adjacent the longitudinally forward end of vehicle front door opening. In this example, while positive, robust connections of the instrument panel beam to the body sheet metal, as well as of the body sheet metal to the fender and the door hinge bracket, respectively, are desirable, there may simply not be sufficient room for placement and/or manufacturing all of the desired joints. As such, it is currently difficult to provide all attachments between vehicle structural components as desired, e.g., for managing a vehicle's NVH characteristics.

DRAWINGS

DETAILED DESCRIPTION

Figure 1:
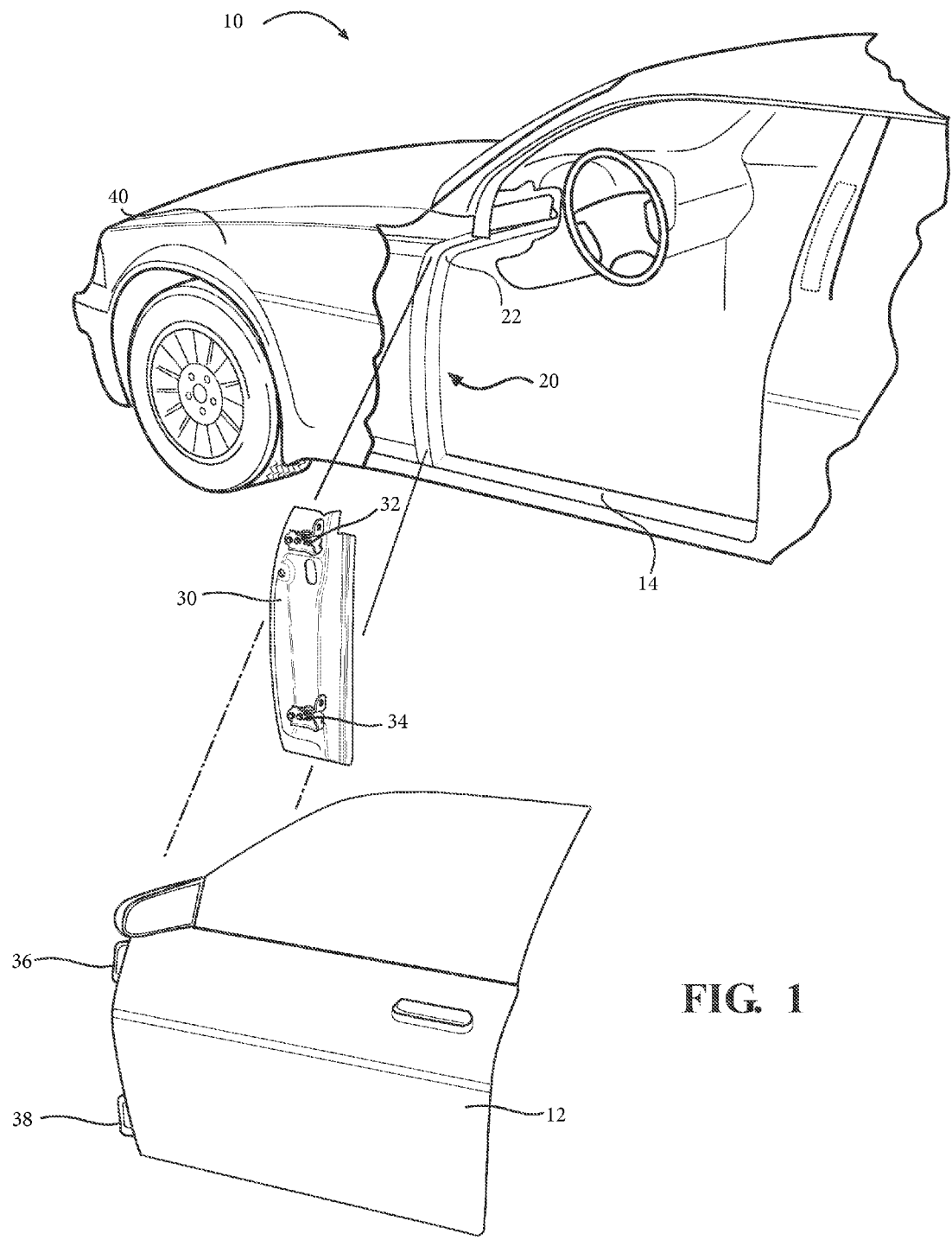
FIG. 1 is a partially exploded and partially cutaway view of components of the longitudinally forward end of a vehicle front door opening for an exemplary assembly according to the principles of the present disclosure.

Referring to FIG. 1, an exemplary vehicle 10 and components thereof for an exemplary assembly according to the principles of the present disclosure are shown in a partially exploded and partially cutaway illustration. It should be understood that various components of the vehicle 10 may be attached at a common joint according to the principles of the present disclosure, and that the assembly of structural components at a common joint according to the principles of the present disclosure may have a variety of applications. Accordingly, it should be understood that the disclosure is exemplary in nature.

The vehicle 10 includes a door 12 and a corresponding door opening 14. The vehicle 10 is supported by a frame 20 including a cross car or instrument panel beam 22. The cross car beam 22 extends laterally across the vehicle 10 and supports, e.g., the vehicle instrument panel. The frame 20, including the cross car beam 22, may include a variety of materials, e.g., metallic materials such as aluminum and steel. The vehicle 10 further includes a body component 30 for overlapping the frame 20 at the longitudinally forward periphery of the door opening 14. The body component may include a variety of materials such as, e.g., sheet metal. The body component 30 includes upper and lower hinge base brackets 32, 34 secured to a laterally outside surface thereof complementary to upper and lower door hinge brackets 36, 38 on the door 12. The vehicle 10 further includes another body component, a front fender 40 (shown in partially cutaway view in FIG. 1), which partially overlaps the cross car beam 22 and the body component 30 at the longitudinally forward periphery of the door opening 14. The front fender 40 may include any suitable materials.

Figure 2:
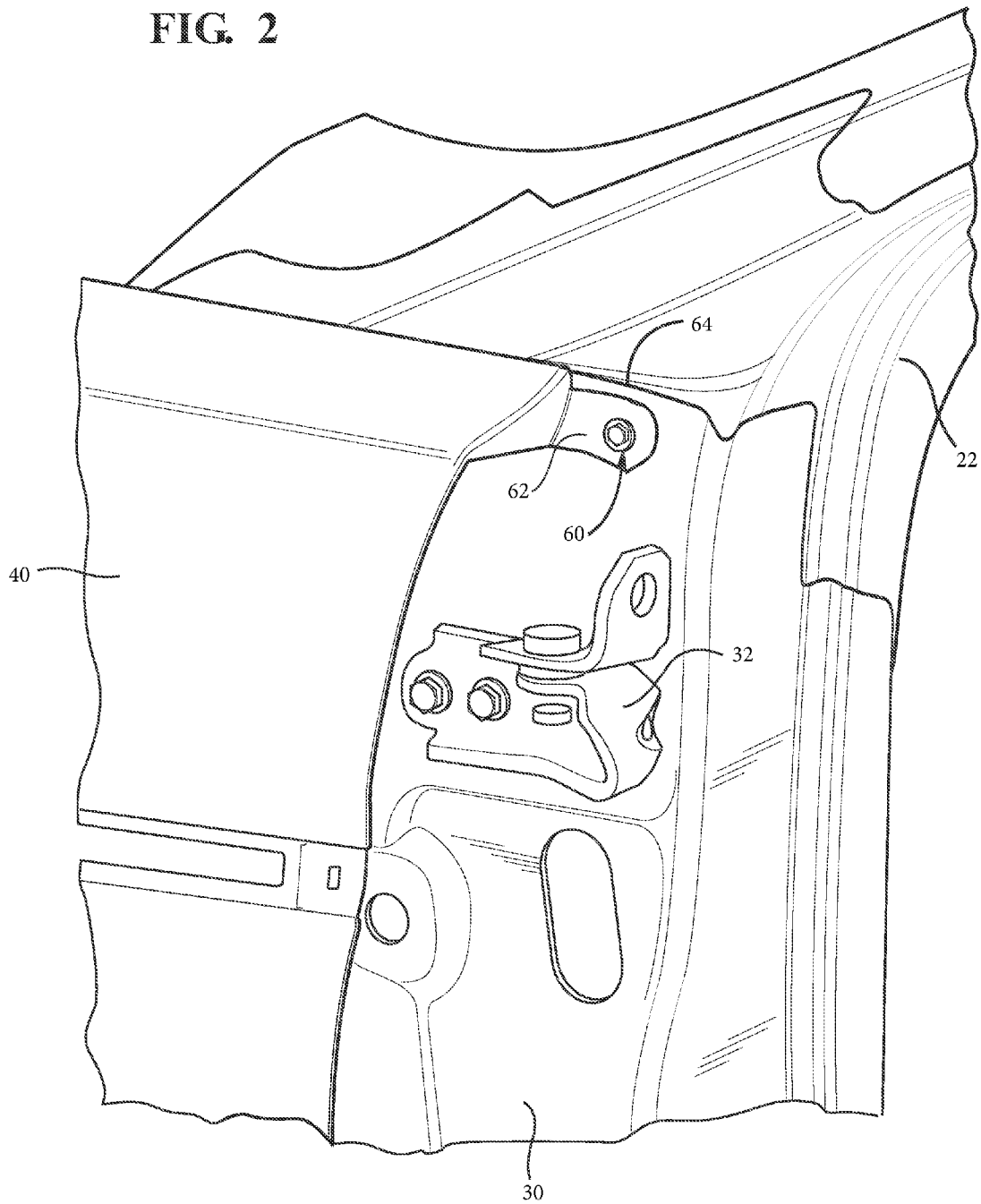
FIG. 2 is perspective view of an exemplary assembly according to the principles of the present disclosure.
Figure 3:
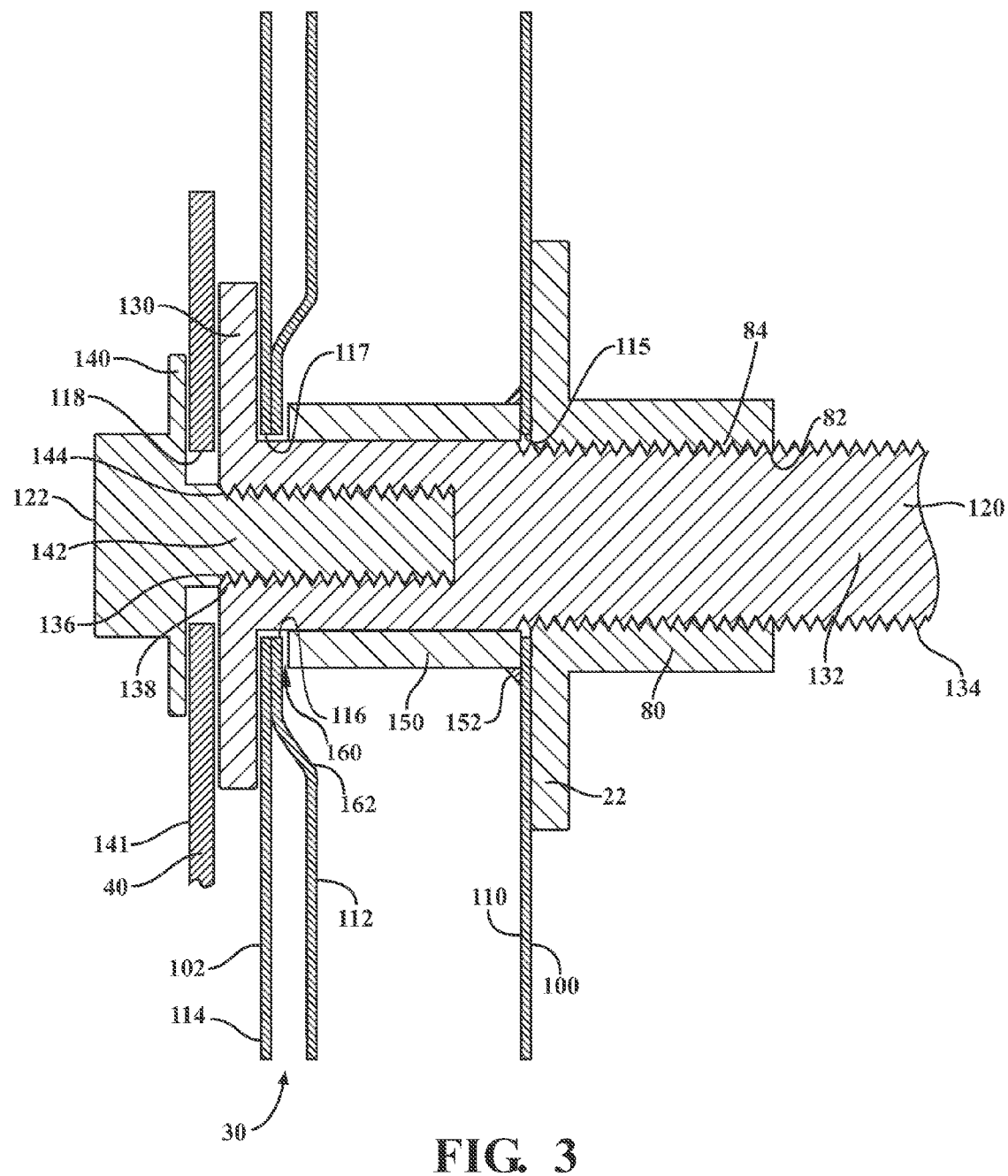
FIG. 3 is a cross-sectional view of an exemplary assembly according to the principles of the present disclosure.

With additional reference to FIGS. 2-3, the vehicle 10 includes a common joint or attachment 60 between the cross car beam 22, the body component 30 and the front fender 40. The front fender 40 includes a flange 62 located vertically between the upper hinge base bracket 32 and a top end 64 of the body component 30. The cross car beam 22 is the base component of the common joint 60. In an exemplary implementation, the cross car beam 22 is in the form of a beam tube, and the cross car beam 22 includes an inwardly extending flange 80 defining a base aperture 82. The base aperture 82 includes threads 84.

At least at the common joint 60, the body component 30 includes an inside surface 100 abutting the cross car beam 22 and an outside surface 102 opposite the inside surface 100. In some implementations, the body component 30 may be in the form of a composite or multi-layered structural component made from, e.g., multiple layers of sheet metal. For example, as particularly illustrated in FIG. 3, the body component 30 includes an inner layer 110, a reinforcement layer 112 and an outer layer 114. The inside surface of the inner layer 110 defines the inside surface 100 of the body component 30. The outside surface of the outer layer 114 defines the outsides surface 102 of the body component 30. The layers of the body component 30, as well as the front fender 40, include through apertures 115, 116, 117, 118, respectively, corresponding to each other and the base aperture 82.

The common joint 60 includes a first joint or fastening member 120 securing the body component 30 to the cross car beam 22 and a second joint or fastening member 122 securing the front fender 40 to the body component 30. The first joint member 120 has a first flange portion 130 engaging the outside surface 102 of the body component 30 and a first shaft portion 132 engaging the cross car beam 22. The first shaft portion 132 is sized complementary to the base aperture 82 of the cross car beam 22 and includes external threads 134 complementary to the threads 84 of the base aperture 82. The first shaft portion 132 threads into the base aperture 82 until the first flange portion 130 engages the outside surface 102 of the body component 30 to secure the body component 30 relative to the cross car beam 22. The first joint member 120 also includes a blind aperture 136 extending through the first flange portion 130 into the first shaft portion 132. The blind aperture 136 includes internal threads 138.

The second joint member 122 of the common joint 60 includes a second flange portion 140 engaging an outside surface 141 of the front fender 40 and a second shaft portion 142 engaging the first joint member 120. The second shaft portion 142 is sized complementary to the blind aperture 136 and includes external threads 144 complementary to the internal threads 138 of the blind aperture 136. The second shaft portion 142 threads into the blind aperture 136 until the second flange portion 140 engages the outside surface 141 of the front fender 40 to secure the front fender 40 between the first and second joint members 120, 122 and, therefore, relative to the body component 30 and the cross car beam 22. The front fender 40 may be spaced apart from the body component 30 by the second joint member 122 at least at and adjacent to the common joint 60, and the second joint member 122 may be any suitable fastener, e.g., a bolt. Accordingly, multiple vehicle structural components may be positively and robustly secured at a common joint towards both efficiently utilizing vehicle packaging space and managing a vehicle's NVH characteristics.

In implementations in which the body component 30 is in the form of a composite or multi-layered structural component such as the inner layer 110, the reinforcement layer 112 and the outer layer 114, the common joint 60 may further include a spacing member 150 secured to one of the layers of the body component 30. The spacing member 150 may be in the form of, e.g., by way of non-limiting example, a barrel nut or a tolerance absorber. For example, as particularly illustrated in FIG. 3, the spacing member 150 may be disposed between the inner layer 110 and the reinforcement layer 112, may be joined or affixed to the inner layer 110, e.g., with a weld 152, and may be positioned so as to overlap with the through aperture 115. The spacing member 150 may extend around the first shaft portion 132 of the first joint member 120.

Additionally, in some implementations, the common joint 60 may include a framing gap 160, for accommodating variations in manufacturing and assembly processes. As shown in the exemplary illustration of FIG. 3, the framing gap 160 may be defined between an end of the spacing member 150 opposite the weld 152 and the reinforcement layer 112. The reinforcement layer 112 may include a contoured portion 162 complementary to the spacing member 150 and the configuration of the inner and outer layers 110, 114 to define the framing gap 160.

In the drawings, the same reference numbers indicate the same elements. Further, some or all of these elements could be changed. Accordingly, it is to be understood that the above description is intended to be illustrative and not restrictive. For example, a spacing member, and/or a framing gap, may be located or attached to a variety components of a common joint according to the principles of the present disclosure Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An assembly comprising:
a base component secured to vehicle frame components;
a first body component having an inside surface abutting the base component;
a first fastening member coupling the first body component and the base component, the first fastening member having a first flange portion engaging an outside surface of the first body component and a first shaft portion engaging the base component;
a second body component abutting the first flange portion of the first fastening member; and
a second fastening member coupling the second body component to the first body and base components, the second fastening member having a second flange portion engaging the second body component and a second shaft portion engaging the first shaft portion of the first fastening member.

2. The assembly of claim 1, wherein the first body component includes a plurality of layers between the base component and the second body component.

3. The assembly of claim 2, further comprising a spacing member between inner and reinforcement layers of the first body component, the inner layer being between the reinforcement layer and the base component, the first shaft portion of the first fastening member extending through the spacing member.

4. The assembly of claim 3, further comprising a framing gap disposed between the spacing member and the reinforcement layer of the first body component.

5. The assembly of claim 3, wherein the first body component includes an outer layer between the second body and the reinforcement layer of the first body component.

6. The assembly of claim 3, wherein the spacing member is joined to the inner layer of the first body component.

7. The assembly of claim 1, wherein the base component includes a threaded aperture and the first shaft portion of the first fastening member has complementary external threads engaging the threaded aperture of the base component.

8. The assembly of claim 7, wherein base component is a beam tube for a vehicle frame assembly, the beam tube having an internally extending flange defining the threaded aperture.

9. The assembly of claim 1, wherein the first fastening member includes a blind aperture extending through the first flange and into the first shaft portion, the second fastening member engaging the blind aperture of the first fastening member.

10. The assembly of claim 9, wherein the blind aperture is threaded, and the second shaft portion of the second fastening member includes external threads complementary to the blind aperture.

11. The assembly of claim 10, wherein the second fastening member is a bolt.

12. An assembly comprising:
a vehicle frame component;
a first vehicle body component having an inside surface abutting the vehicle frame component;
a first joint member coupling the first vehicle body component to the vehicle frame component, the first joint member having a first flange portion engaging the outside surface of the first vehicle body component and a first shaft portion engaging the vehicle frame component;
a second vehicle body component abutting the first flange portion opposite the first vehicle body component; and
a second joint member coupling the second vehicle body component to the first vehicle body component and the vehicle frame component, the second joint member having a second flange portion engaging the second vehicle body component and a second shaft portion engaging the first shaft portion of the first joint member, the first and second joint members defining a common joint between the vehicle frame component and the first and second vehicle body components.

13. The assembly of claim 12, further comprising a coupling bracket secured to the outside surface of first vehicle body component, the coupling bracket being displaced from the common joint.

14. The assembly of claim 13, wherein the vehicle frame component is a cross car beam, the second vehicle body component is a front fender, and the coupling bracket is a door hinge base.

15. The assembly of claim 14, wherein the coupling bracket is an upper door hinge base, and the common joint is disposed between the upper door hinge base and an upper end of the second vehicle body component.

16. The assembly of claim 12, wherein the first vehicle body component includes a plurality of layers between the vehicle frame component and the second vehicle body component.

17. The assembly of claim 16, further comprising a spacing member disposed between inner and reinforcement layers of the first vehicle body component, the inner layer being between the reinforcement layer and the base component, the first shaft portion of the first joint member extending through the spacing member.

18. The assembly of claim 17, further comprising a framing gap disposed between the spacing member and the reinforcement layer of the first vehicle body component.

19. The assembly of claim 17, wherein the first vehicle body component includes an outer layer between the second vehicle body component and the reinforcement layer of the first vehicle body component.

20. The assembly of claim 17, wherein the spacing member is affixed to the inner layer of the first vehicle body component.

* * * * *